(12) United States Patent
Sheng et al.

(10) Patent No.: US 11,348,340 B1
(45) Date of Patent: May 31, 2022

(54) TRACKING ARTICULATED OBJECTS

(71) Applicant: Zoox, Inc., Foster City, CA (US)

(72) Inventors: Shiwei Sheng, Cupertino, CA (US); Subhasis Das, Menlo Park, CA (US); Yassen Ivanchev Dobrev, Foster City, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 273 days.

(21) Appl. No.: 16/804,717

(22) Filed: Feb. 28, 2020

(51) Int. Cl.
*G06V 20/58* (2022.01)
*G06T 7/277* (2017.01)

(52) U.S. Cl.
CPC .............. *G06V 20/58* (2022.01); *G06T 7/277* (2017.01)

(58) Field of Classification Search
CPC ................................ G06V 20/58; G06T 7/277
USPC ......................................................... 701/301
See application file for complete search history.

(56) References Cited

U.S. PATENT DOCUMENTS

2021/0019036 A1* 1/2021 Wang ...................... G06F 3/014
2021/0179143 A1* 6/2021 Shin .................. B60W 60/0015

* cited by examiner

*Primary Examiner* — Allen C Wong
(74) *Attorney, Agent, or Firm* — Lee & Hayes, P.C.

(57) ABSTRACT

Navigation systems can identify objects in an environment and generate representations of those objects. A representation of an articulated vehicle can include two segments rotated relative to each other about a pivot, with a first segment corresponding to a first portion of the articulated vehicle and the second segment corresponding to a second portion of the articulated vehicle. The articulated object can be tracked in the environment by generating estimated updated states of the articulated agent based on previous states and/or measured states of the object using differing motion model updates for the differing portions. The estimated updated states may be determined using one or more filtering algorithms, which may be constrained using pseudo-observables.

20 Claims, 5 Drawing Sheets

TRACKING ARTICULATED OBJECTS

BACKGROUND

Planning systems in vehicles, e.g., autonomous vehicles, use information associated with objects in an environment to determine actions for navigating through the environment. In some examples, a planning system may generate a representation of an object, e.g., a bounding box, to represent the object's position, orientation, and/or extents, and may be used to predict movement of the object. In a two-dimensional space, a bounding box may be a rectangle or other polygon. In a three-dimensional space, a bounding box may be a three-dimensional object defined by eight corners.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
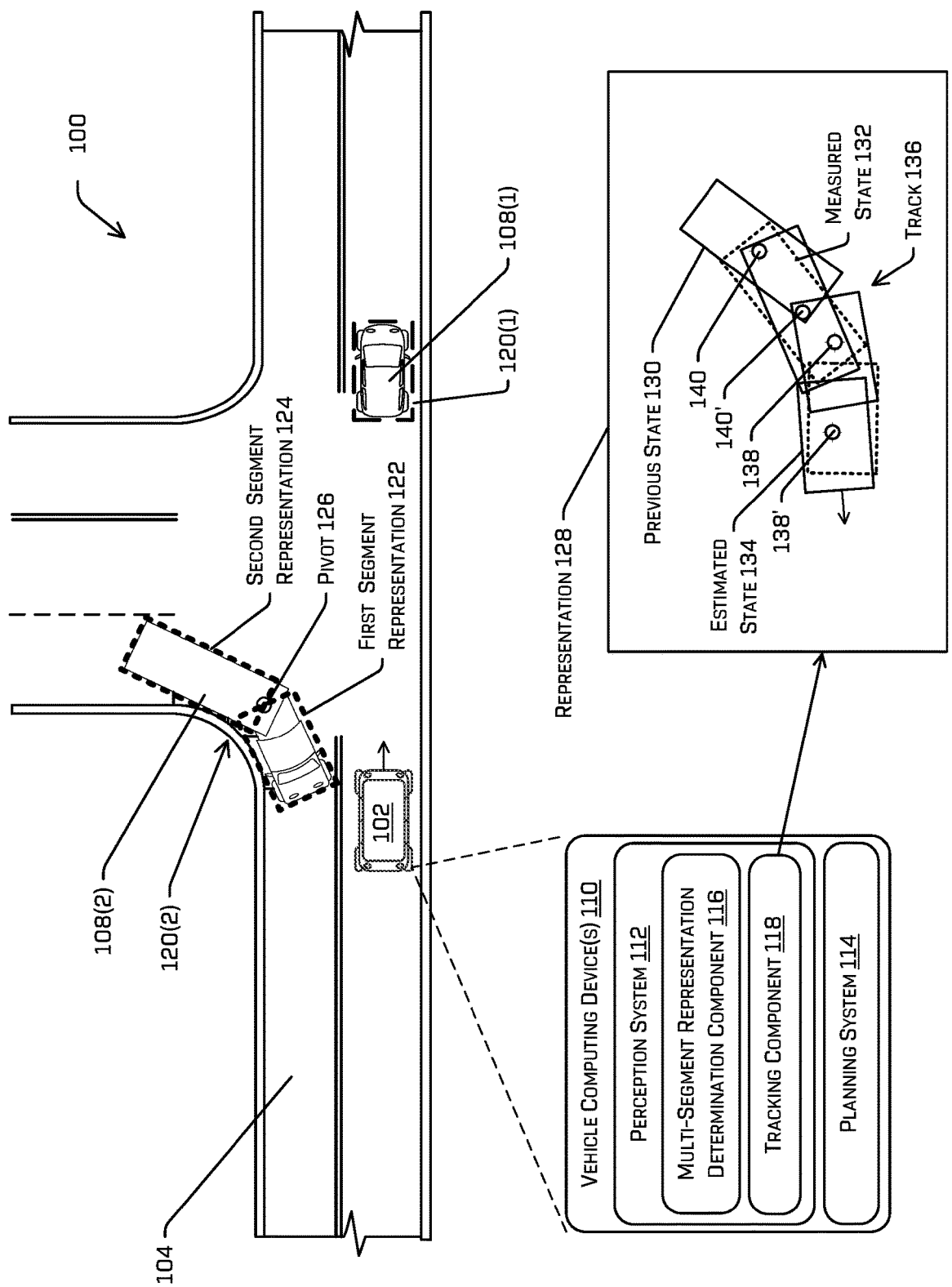
FIG. 1 is a schematic diagram illustrating an example implementation of tracking articulated objects in an environment, according to aspects of this disclosure.

This disclosure describes methods, apparatuses, and systems for generating and tracking representations of sensor data. Such representations can be used to model objects in an environment, e.g., to navigate relative to those objects. For example, a fully- or semi-autonomous vehicle can include a plurality of sensors to capture sensor data corresponding to the environment in which the vehicle is travelling. The environment can, in some instances, include multiple objects (e.g., pedestrians, vehicles, bicyclists, etc.). Accordingly, the sensor data can be processed, classified, and/or otherwise grouped to represent individual objects.

In some conventional systems, individual objects in an environment may be represented by bounding boxes. For instance, in a two-dimensional, top-down representation of an environment, an object may be depicted as a rectangular bounding box that substantially encompasses the length and width of the object. Such a rectangular bounding box can generally approximate (and encompass) the extents of a footprint of most objects. For instance, a rectangular bounding box may be an adequate representation objects, including stationary objects, pedestrians, bicyclists, and most vehicles. However, some objects are not well represented by a single rectangular bounding box. For instance, articulated objects, e.g., objects that have multiple, connected bodies that can rotate relative to each other (for instance, articulated busses), have varied footprints depending on the attitude of the bodies relative to each other. For instance, when the bodies are axially aligned, a bounding box can have a length that is the combined length of the first and second bodies and a width that is the larger of the widths of the first and second bodies. However, when the bodies are rotated 90-degrees relative to each other (such as when going around a curve), the bounding box can have a length that is the length of the longer of the first and second bodies and a width that is approximately the length of the shorter of the first and second bodies. At angles up to 90-degrees, the width and length of the bounding box will further change. As a result, much of the area of the bounding box may not correspond to the footprint of the object, which can result in overestimation of the actual extents of the articulated object.

As discussed herein, a multi-segment model may be used to represent articulated objects. For instance, a multi-segment model can include a first segment associated with a first body of the articulated object and a second segment associated with a second body of the articulated object (and additional segments as necessary). The first segment can be a geometric shape, such as a first rectangle, and the second segment can be a geometric shape, such as a second rectangle. In examples, the first segment may have a first length and a first width, and the second segment may have a second length and a second width.

Aspects of this disclosure relate to generating this multi-segment models, including iteratively generating updated models to estimate a track of the articulated object. In some instances, a track may be a collection of previous states of an articulated agent, e.g., as multi-part representations and a next-estimated state of the articulated object.

In some implementations, a tracking system, such as a tracking system on a vehicle, can receive track information including information about a previous state of an articulated object. The previous state information can include information about each of a plurality of segments representing the articulated object. In an example two-part articulated object, such as a tractor-trailer with a single trailer, the previous state information can include a first location (e.g., of a center) of a first segment representing the first part (the cab or tractor) of the articulated object and a second location (e.g., a center) of a second segment representing the second part (the trailer) of the articulated object. Additional previous state information can include extents of the first and second segments, velocities associated with the first and second segments, yaw angles associated with the first and second segments, yaw rates associated with first and second segments and/or additional information.

In some aspects, the tracking system can also generate a projected state of the articulated object, e.g., at a predetermined time and based on the previous state information. In some examples, the projected state can be estimated based on the previous state information. For instance, a projected position of the first segment can be based on the previous position, previous velocity, and/or previous yaw rate of the first segment, based on the predetermined time. Similarly, the projected yaw angle of the first segment can be based on the previous yaw angle, the previous yaw rate, and the predetermined time. The tracking system can similarly determine projected state information of the second segments.

Also in some aspects of this disclosure, the tracking system can receive a measured model of the articulated object. For example, a multi-segment model of the articulated object can be determined from sensor data generated by sensors on the vehicle. The measured model can include measured state information. In at least some examples described herein, such models may comprise contraints or boundary conditions to be imposed in state estimation and propagation with respect to the two (or more) models for the individual components.

In some aspects of this disclosure, the tracking system can determine differences between the projected state of the articulated object and the measured state information. In some examples, such differences may be measurable differences based on observable. For instance, the differences can include distances between centers of the projected and measured segments, differences in the extents, angular differences between the projected and measured yaw rates, or the like. The differences also may be determined using pseudo-observables associated with the multiple segments. Pseudo-observables can include constraints resulting from dynamics of the articulated object. In some examples, because two segments of an articulated representation share a common point, positions on the segments, e.g., centers of the segments will have a definable relationship relative to the shared point. In other examples, pseudo-observables can include constraints resulting from one of the parts of the articulated object being a driving part and the other being a towed (or pushed) part.

In some implementations, the errors can be used to determine an updated state, e.g., an updated estimate, of the articulated object. The updated state can be determined using one or more filtering algorithms, such as extended Kalman filtering algorithms. In some examples, the updated state can be based on the projected state of the articulated object, a Kalman filter gain, and the error. For instance, the product of the Kalman filter gain and the error can be a correction term for updating the estimated state. Of course, such algorithms are only discussed herein as examples and any other model for state propagation (including, but not limited to, regressive or predictive machine learned models) are contemplated.

Techniques described herein may be directed to better leveraging sensor and perception data to enable a vehicle, such as an autonomous vehicle, to navigate through an environment while circumventing objects in the environment. Techniques described herein can utilize information sensed about the objects in the environment to more accurately determine extents of the objects and/or a track of the object. For example, techniques described herein may be faster and/or more robust than conventional techniques, as they may increase the reliability of representations of sensor data, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination without reacting to incorrect object representations.

While this disclosure uses an autonomous vehicle in examples, techniques described herein are not limited application in autonomous vehicles. For example, any sensor-based and/or mapping system in which objects are identified and represented may benefit from the techniques described. By way of non-limiting example, techniques described herein may be used on aircrafts, e.g., to generate representations of objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that maps objects.

FIGS. 1-5 provide additional details associated with the techniques described herein.

FIG. 1 is a schematic diagram illustrating an example implementation of tracking an articulated vehicle in an environment. More specifically, FIG. 1 illustrates an example environment 100 in which a vehicle 102 is operating. In the illustrated example, the vehicle 102 is driving on a road 104 in the environment 100, along a trajectory 106. However, in other examples the vehicle 102 may be stationary and/or parked in the environment 100. In the example, the road 104 includes a number of driving lanes meeting at an intersection or junction. The road 104 is for example only; techniques described herein are applicable to other lane configurations and/or other types of driving surfaces, e.g., parking lots, private roads, driveways, or the like.

The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 is any configuration of vehicle, such as, for example, a van, a sport utility vehicle, a cross-over vehicle, a truck, a bus, an agricultural vehicle, and/or a construction vehicle. The vehicle 102 is powered by one or more internal combustion engines, one or more electric motors, hydrogen power, any combination thereof, and/or any other suitable power source(s). Although the vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

In the scenario illustrated in FIG. 1, two additional vehicles also are traveling on the road 104. Specifically, the environment 100 includes a first additional vehicle 108(1) and a second additional vehicle 108(2) (collectively, the additional vehicles 108). Although FIG. 1 illustrates only the additional vehicles 108 as entities traveling on the road 104, many other types of entities, including, but not limited to, buses, bicyclists, pedestrians, motorcyclists, animals, or the like may also or alternatively be traveling on the road 104 and/or otherwise present in the environment 100 (including along a side of the road 104).

The vehicle 102 collects data as it travels through the environment 100. For example, the vehicle 102 includes one or more sensor systems, which can include, for example, one or more LiDAR sensors, RADAR sensors, SONAR sensors, time-of-flight sensors, image sensors, audio sensors, infrared sensors, location sensors, etc., or any combination thereof. The sensor system(s) are disposed to capture sensor data associated with the environment. For example, the sensor data may be processed by a vehicle control system or other processing system to identify and/or classify data associated with objects in the environment 100, such as the additional vehicles 108. In addition to identifying and/or classifying the data associated with the additional vehicles 108, the vehicle control system may also identify and/or classify additional objects, e.g., trees, vehicles, pedestrians, buildings, road surfaces, signage, barriers, road markings, or the like. In specific implementations of this disclosure, the sensor data may be processed by the vehicle control system to identify portions of the data that are associated with an articulated object, such as an articulated vehicle.

As also shown in FIG. 1, the vehicle 102 includes one or more vehicle computing devices 110. For example, the vehicle computing device(s) 110 include a perception system 112 and a planning system 114. The perception system 112 also includes a multi-segment representation determination component 116 and a tracking component 118. Although the multi-segment determination component 116 and the tracking component 118 are depicted in FIG. 1 as being a part of the perception system 112, it should be understood that the multi-segment determination component 116 and/or the tracking component 118 may form a part of the planning system 114 and/or may be separate from both the perception system 112 and the planning system 114. Moreover, the multi-segment determination component 116 and/or the tracking component 118 may reside in/on a separate computing device, e.g., a remote computing device.

In general, the perception system 112 includes functionality to detect objects in the environment 100, such as the additional vehicles 108. The perception system 112 provides information about the objects to the planning system 114, which includes functionality to determine, based on the information, how to operate the vehicle 102 relative to the detected objects. For example, the planning system 114 may determine the trajectory 106 based at least in part on data from the perception system 112 and/or other information such as, for example, one or more maps, localization information (e.g., where the vehicle 102 is in the environment relative to a map and/or features detected by the perception system 112), and/or the like. The trajectory 106 may comprise instructions for one or more vehicle controllers to actuate drive components of the vehicle 102 to effectuate a steering angle and/or steering rate, which may result in a vehicle position, vehicle velocity, and/or vehicle acceleration. For example, the trajectory 106 may comprise a target heading, target steering angle, target steering rate, target position, target velocity, and/or target acceleration. The perception system 112, the planning system 114, the multi-segment determination component 116, and/or the tracking component 118 may include one or more machine-learned (ML) models and/or other computer-executable instructions.

In some examples, the perception system 112 receives sensor data from sensor(s) on the vehicle 102 and determines data related to objects in the vicinity of the vehicle 102 (e.g., object classifications associated with detected objects, instance segmentation(s), semantic segmentation(s), two and/or three-dimensional bounding boxes, tracks), route data that specifies a destination of the vehicle 102, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), or other information.

In some examples, the perception system 112 may comprise a pipeline of hardware and/or software (though not necessarily indicative of any order of operations), which may include one or more GPU(s), ML model(s), Kalman filter(s), and/or the like. In some examples, the perception system 112 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise LIDAR and/or radar data, which the perception system 112 may receive as input. The perception system 112 may be configured to detect as many objects and information about the environment as possible to avoid failing to account for an event or object behavior that should be taken into account by the planning system 114 in determining the trajectory 106.

Among other functionality, the perception system 112 generates representations of objects from the sensor data. For instance, FIG. 1 illustrates a first representation 120(1) associated with the first additional vehicle 108(1) and a second representation 120(2) associated with the second additional vehicle 108(2) (collectively, the first representation 120(1) and the second representation 120(2) are referred to as the representations 120). In examples, the representations 120 may be two-dimensional polygons or groupings of polygons that approximate the extents of the respective additional vehicles 108. In the top-down illustration of FIG. 1, each of the representations 120 includes one or more rectangles, which may be two-dimensional bounding boxes. In other implementations, the representations 120 may be differently shaped and/or other than two-dimensional (e.g., three-dimensional).

In more detail, the first representation 120(1) is a single two-dimensional geometric structure, e.g., a rectangle. The first representation 120(1) is sufficient to model the respective first additional vehicle 108(1), because, even when the first additional vehicle 108(1) moves, the overall extents of the additional vehicle e.g., the overall footprint of vehicle, may vary only slightly. In contrast, the second additional vehicle 108(2) is a tractor-trailer comprising a cab towing a trailer. The cab and trailer are not fixed as a rigid body, but instead, the trailer is attached such that it may pivot relative to the cab. The tractor-trailer represents one type of an articulated vehicle. Other types of articulated vehicles may include, but are not limited to, articulated buses, tow trucks with vehicles in tow, passenger vehicles towing other objects, or the like. Generally, and as used herein, an articulated object may refer to any object having two or more bodies that are movable relative to each other. Articulated objects may be characterized as having a footprint that changes as a result of articulation of the object.

The multi-segment representation determination component 116 generates the second representation 120(2) to better (e.g., than a single box encompassing the extents of the second additional vehicle 108(2)) model the second additional vehicle 108(2). In examples, the multi-segment representation determination component can model the second additional vehicle 108(2) as a first segment representation 122 and a second segment representation 124 moveable relative to the first segment representation 122 about a pivot 126. In this example, the first segment representation 122 represents the cab of the tractor trailer, the second segment representation 124 represents the trailer of the tractor trailer, and the pivot 126 approximates a connection between the cab and the trailer. In some examples, the multi-segment representation determination component 116 can generate the second representation 120(2) using modeling techniques described in U.S. patent application Ser. No. 16/586,455, entitled "Modeling Articulated Objects," filed Sep. 27, 2019, the entire contents of which are hereby incorporated by reference. For example, aspects of that application describe using an expectation maximization model to generate an articulated model, like the second representation 120(2).

As may be appreciated, modeling the second additional vehicle 108(2) using the multiple segment representation 120(2) provides a more accurate representation of the environment 100, when compared to conventional, single-shape representations. Because such conventional representations can fit the entire extents of an object into a single box or rectangle, a representation of an articulated object may be overinclusive, thereby leading to overly cautious operation of the vehicle 102 in some instance. Thus, multi-segment representations, like the second representation 120(2) can lead to more efficient, effective, and/or comfortable navigation by the vehicle 102.

The tracking component 118 may receive one or more environment representations and/or object detections from respective perception pipelines, e.g., from the multi-segment representation determination component 116, and determine whether or not to associate a formerly generated track with a current object detection or to generate a new track in association with a current object detection. A track may comprise a historical, current, and/or predicted object position, velocity, acceleration, and/or heading. The tracking component 118 may additionally or alternatively determine a final environment representation and/or an estimated object detection that may act as a summary of the different object detections. In some examples, the tracking component 118 discussed herein may determine an estimated object detection by inputting multi-segment object representations and/or sensor data associated with an articulated object into a model that is trained to output a final environment representation that may comprise an estimated articulated object detection. For instance, the model may include an extended Kalman filter that determines an updated state, e.g., a next state in a track, of an articulated object based at least in part on a projection of a last estimated state, and a measured state.

For example, FIG. 1 illustrates a top-down representation 128 of the environment 100 that may be part of an environment representation determined by the tracking component 118. The top-down representation 128 includes a previous state 130 of the articulated second additional vehicle 108(2). For clarity, only the single previous state 130 is illustrated, but additional previous states also may be included. As shown, the previous state 130 includes a two-segment representation with a first segment having a first segment center 138 and a second segment have a second segment center 140. The top-down representation 128 also includes a measured state 132. For example, the measured state 132 is a two-part representation generated by the multi-segment representation determination component 116, e.g., from sensor data received at the perception system 112. The top-down representation also includes an estimated state 134, which, as detailed further herein, can be generated based at least in part on the previous state 130 and the measured state 132. In the example, the previous state 130 and the estimated state 134 comprise a track 136 associated with the second additional vehicle 108(2). As illustrated, the estimated state 134 an updated first segment center 138' and an updated second segment center 140'.

As illustrated, the estimated state 134 is different from the measured state 132 (which is exaggerated for illustrative purposes in this particular example). For example, the estimated state 134 may be determined by the tracking component 118 based at least in part on a predicted position of the previous state 130 and the measured state 132. As noted above, the track 136 can include additional instances of the state of the second additional vehicle 108(2), e.g., prior to the previous state 130. In examples, the tracking component 118 iteratively generates estimated states, like the previous state 130 and the estimated state 134 based at least in part on the most recently estimated state and a next measured state generated by the multi-segment representation component 116.

In some examples, the tracking component 118 can determine the estimated state 134 as state information about each segment. For example, the first segment may be described by observables including one or more of a location, e.g., x-, y-coordinates, of the updated first segment center 138', extents, e.g., in the x- and y-directions, of the first segment, velocities, e.g., in the x- and y-directions, of the first segment center 138', a yaw angle of the first segment and/or a yaw rate of the first segment. Similarly, the second segment may be described by observable including one or more of a location, e.g., x-, y-coordinates, of the updated second segment center 140', extents, e.g., in the x- and y-directions, of the second segment, velocities, e.g., in the x- and y-directions, of the second segment center 140', a yaw angle of the second segment and/or a yaw rate of the second segment. Some conventional tracking systems can determine an estimated state of a single segment representation using a normal motion model. For example, tracking a single representation may be accomplished using an extended Kalman filter that determines an estimated state as a linear relationship of a previous state plus some motion noise.

In examples of this disclosure, the tracking component 118 may use multiple extended Kalman filters, e.g., one for each segment, to determine the updated state. In the example of FIG. 1, in which the second additional vehicle 108(2) has two articulating segments, the tracking component 118 can use two extended Kalman filters, e.g., a first for the first segment and a second for the second segment. When applying the two Kalman filters, observables for each of the two segments may include the location of each center, e.g., the locations of the updated first segment center 138' and of the updated second segment center 140', the extents of the two segments, and the yaw angles for each of the segments. However, the tracking component 118 can also constrain the motion of the two segments relative to each other, e.g., because the first and second portions of the second additional vehicle 108(2) are fixed to each other (e.g., as may be indicated by the articulated agent detection component described in detail above). To constrain the motion of the first segment and the second segment when applying the extended Kalman filters, the tracking component 118 can use pseudo-observables (or pseudo-measurements). In at least some examples, such pseudo-observables may be associated with an expected relationship resulting from the constrained motion of the articulated object. The pseudo-observables can be used as constraints in the extended Kalman filters, e.g., to better model motion of the articulated object.

A first pseudo-observable may be based on a connection point of the segments. Considering the two-segment representation 120(2), the pivot 126 represents the connection point of the first segment representation 122 and the second segment representation 124. Conceptually, movement of a center point of the first segment representation 122 to the pivot 126 and movement of a center point of the second segment representation 124 to the pivot should be equal. In more detail, consider the first segment representation 122 as having a center $(x_1, y_1)$, a longitudinal extent $Ex_1$, a lateral extent $Ey_1$, and a yaw angle $\theta_1$ as an angle of the longitudinal axis of the segment to horizontal. Also consider the second segment representation 124 as having a center $(x_2, y_2)$, a longitudinal extent $Ex_2$, a lateral extent $Ey_2$, and a yaw angle $\theta_2$ as an angle of the longitudinal axis of the second segment to horizontal. With these considerations, the first pseudo-observable can be expressed given Equations (1) and (2), as follows:

$$\left(x_1 - \frac{Ex_1}{2}\cos\theta_1\right) - \left(x_2 - \frac{Ex_2}{2}\cos\theta_2\right) = 0 \quad (1)$$

$$\left(y_1 - \frac{Ey_1}{2}\sin\theta_1\right) - \left(y_2 - \frac{Ey_2}{2}\sin\theta_2\right) = 0 \quad (2)$$

The second pseudo-observable can represent a non-holonomic constraint. Conceptually, the non-holonomic constraint assumes that the first segment representation 122 is steering and that the second segment representation 124 is following. More specifically, the first segment representation 122 turns based on steering at the leading edge of the first segment representation 122, e.g., opposite the second segment representation. Stated differently, the leading edge of the first segment representation 122 approximates the front axis of the leading portion of the articulated agent. Similarly, the second segment representation 124, in at least some examples, may be assumed to have a lead axle through the pivot 126. Continuing the example of the first segment representation 122 and the second segment representation 124 used to describe equations (1) and (2), the non-holonomic constraint of the first segment representation 122 can be expressed as Equation (3), as follows:

$$(Vx_1\sin\theta_1 + Vy_1\cos\theta_1) - \frac{Ex_1}{2}\dot{\theta}_1 = 0 \quad (3)$$

in which $Vx_1$ represents a longitudinal velocity of the center of the first segment representation 122, $Vy_1$ represents a lateral velocity of the center of the first segment representation 122, and $\dot{\theta}_1$ represents a yaw rate of the first segment representation 122 at the center. The non-holonomic constraint of the second segment representation 124 can be expressed as Equation (4), as follows:

$$\left(Vx_1\sin\theta_2 + Vy_1\cos\theta_2 + \frac{Ex_1}{2}\dot{\theta}_1(\sin\theta_1\sin\theta_2 + \cos\theta_1\cos\theta_2)\right) - Ex_2\dot{\theta}_2 = 0 \quad (4)$$

in which $\dot{\theta}_2$ represents a yaw rate of the second segment representation 124 at the center. Such constraints may, in turn, be represented as pseudo-measurements for incorporation in the filtering approach for the first and second portions, respectively.

Accordingly, in aspects of this disclosure, the tracking component 118 can generate the estimated state using one or more observables, such as the observables discussed above, as well as pseudo-observables, to determine an estimated state for an articulated object. The pseudo-observables may be embodied as constraints in a model executed by the tracking component 118. In examples, the tracking component 118 can filter the first segment and the second segment independently, e.g., using different extended Kalman filters, and then couple the results using the pseudo-observables, for instance. The pseudo-observables discussed above, and the equations expressing the pseudo-observables are for example only. Other constraints may also be used to model the relative movement of segments of an articulated object.

Data produced by the tracking component 118 and/or by other aspects of the perception system 112 may be collectively referred to as perception data. Once the perception system 112 has generated perception data, the perception system 112 may provide the perception data to the planning system 114 and/or additional systems (such as prediction systems) not illustrated in FIG. 1. In some examples, perception data may comprise information about the two segments of the estimated state 134. For instance, the perception data may be a first location, e.g., in a two-dimensional coordinate system, of the updated first segment center 138', a second location of the updated second segment center 140', extents of the first and second segments, and/or other information about the estimated state 134. The perception data may additionally or alternatively comprise information about the track 136, the measured state 132, and/or other aspects of the environment and/or representations, as discussed herein.

The planning system 114 may use the perception data to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning system 114 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 microsecond, half a second) to control the vehicle to traverse the route (e.g., in order to avoid any of the detected objects); and select one of the potential trajectories as the trajectory 106 of the vehicle 102. The trajectory 106 may be used to generate a drive control signal that may be transmitted to drive components of the vehicle 102. In FIG. 1 the trajectory 106 is represented as an arrow indicating a heading, velocity, and/or acceleration, although the trajectory itself may comprise instructions for a controller, and the controller may, in turn, actuate a drive system of the vehicle 102.

In aspects of this disclosure, the tracking component 118 may provide improved functionality for tracking articulated objects, such as the second additional vehicle 108(2). For instance, the tracking component 118 can iteratively estimate a position of each of the first segment representation 122 and the second segment representation 124, to better model the second additional vehicle 108(2) in the environment 100. Additional details of the tracking component are detailed further herein, including in FIG. 2.

Figure 2:
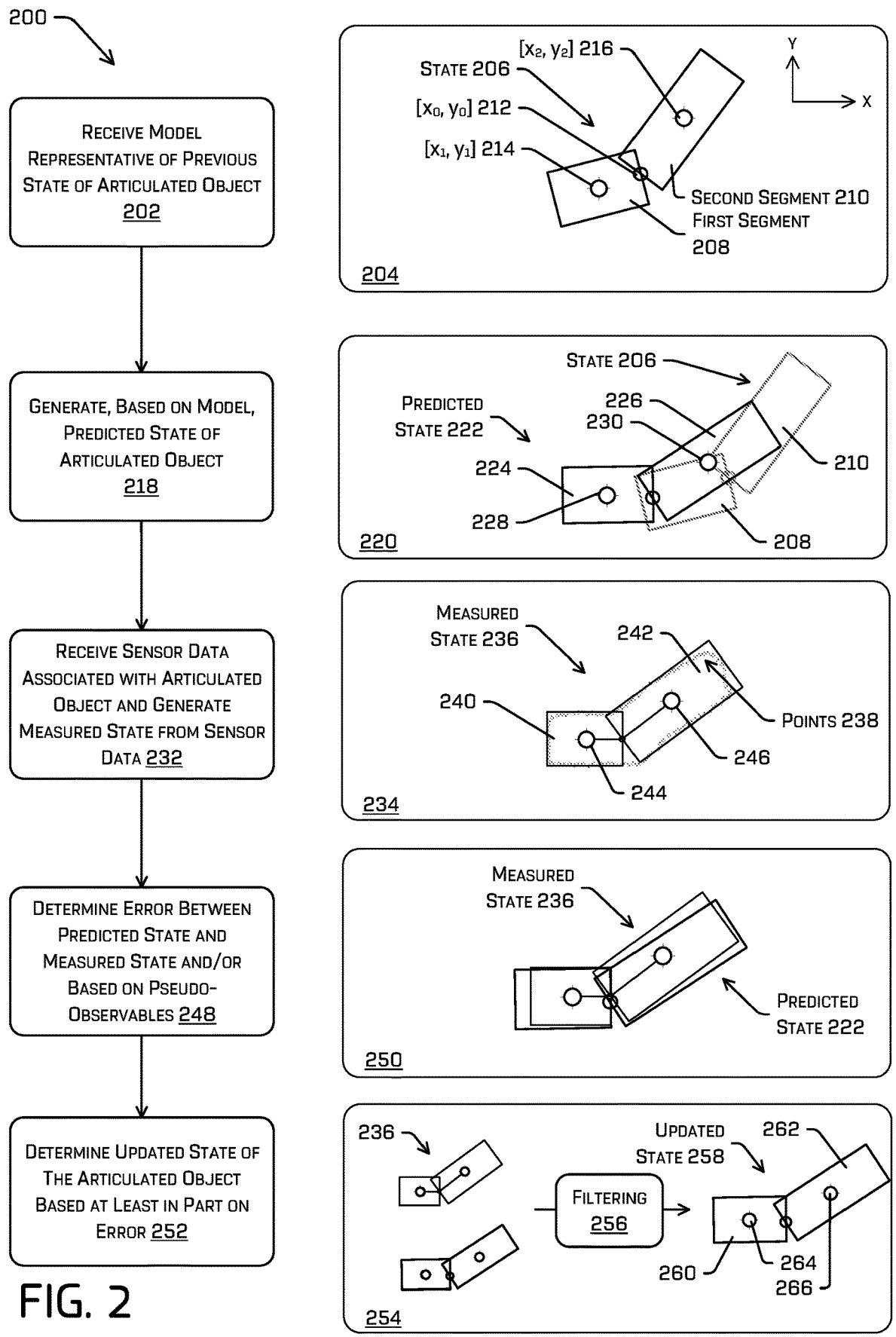
FIG. 2 includes textual and visual flowcharts to illustrate an example method of tracking a two-segment representation of an articulated object, according to aspects of this disclosure.

FIG. 2 represents an example process 200 for generating an updated state, such as the estimated state 134, of an articulated object. In particular, FIG. 2 includes textual and graphical flowcharts illustrative of the process 200, according to implementations of this disclosure. In some examples, the process 200 can be implemented using components and systems illustrated in FIG. 1 and described above, such as the perception system 112, although the process 200 is not limited to being performed by such components and systems. Moreover, the components and systems of FIG. 1 are not limited to performing the process 200.

In more detail, the process 200 can include, at an operation 202, receiving a model representative of a previous state of an articulated object. For example, a perception system of an autonomous vehicle can receive a previous state of an articulated object. The previous state may be the last-most-recently determined state by a tracking component, such as the tracking component 118. In other examples, the previous state can be a last-generated model of the articulated agent. An example 204 accompanies, and illustrates an example of, the operation 202. More specifically, the example 204 illustrates a state 206 of an articulated agent. Specifically, the state includes information about a first segment 208 and a second segment 210. As noted above, the state can include a position of a pivot 212 attaching the first segment 208 and the second segment 210, a position of a first center 214 of the first segment 208, a position of a second center 216 of the second segment, extents, e.g., longitudinal and lateral extents, of the first segment 208 and the second segment 210, velocities, e.g., longitudinal and lateral velocities, of the first segment 208 and the second segment 210, a yaw, e.g., an angle between the longitudinal extent and a reference, of the first segment 208 and the second segment 210, and/or a yaw rate of the first segment 208 and the second segment 210. The example illustrates the state 206 as a top-down representation with a reference coordinate system. In other instances, the state 206 can be otherwise expresses, including but not limited in three-dimensions, in a different coordinate system, or the like. In at least some examples, such a representation may not have previously been associated with an articulated agent. In such examples, the previous representation may have been associated with a non-articulated agent (e.g., in those examples in which an articulated agent was observed traveling a straight line and initiated a turn indicative of an articulated agent) and/or where no previous agent had been observed (e.g., in those situations in which an agent is first observed in sensor data).

At an operation 218, the process 200 can include generating, based on the model, a predicted state of the articulated object. An example 220 accompanying the operation 218 illustrates the operation 218. More specifically, the example 220 illustrates a predicted state 222 including a predicted first segment 224 and a predicted second segment 226. For instance, the predicted first segment 224 may be a projection of the first segment 208 over some period of time, and the predicted second segment 226 may be a projection of the second segment 210 over the same time. The predicted first segment 224 includes a first predicted center 228 and the predicted second segment 226 includes a second predicted center 230. In at least some examples, the projections may be based on a linear relationship, e.g., of the first predicted center 228 to the first center 214, of the predicted first segment 224 to the first segment 208, of the second predicted center 230 to the second center 216, and/or of the predicted second segment 226 to the second segment 210, based on the velocities and/or yaw rates, over the period of time. The example 220 also include the state 206 as a reference.

At an operation 232, the process 200 includes receiving sensor data associated with an articulated object and generating a measured state from the sensor data. An example 234 accompanying the operation 232 illustrates a measured state 236 of an articulated agent, generated from a plurality of points 238. For example, the points 238 may be generated by one or more sensors on an autonomous vehicle and/or may be derived from sensor data captured by one or more sensors on an autonomous vehicle. In some examples, the points 238 may be grouped as a plurality of points associated with a single object. In at least some examples, the points 238 may include segmentation information, which may associate each of the points 238 with an articulated object. For instance, sensor data captured by one or more sensors on an autonomous vehicle, such as the vehicle 102, may be semantically segmented to determine that each of the points 238 is associated with the second additional vehicle 108(2) in FIG. 1. In the illustrated example, the points 238 may be determined as a top-down representation of an object, e.g., in a two-dimensional (e.g., x-y) coordinate system. Although the points 238 include points forming (or outlining) a generally continuous contour, in other examples, sensors may provide data about fewer than all sides of a to-be-modelled object, e.g., because the sensor(s) may be unable to obtain data about hidden or occluded surfaces. In examples, points 238 on such hidden or occluded surfaces may be estimated, e.g., based on known shapes and sizes of objects, and/or the model may be generated without points on the hidden or occluded surfaces.

As noted, the operation 232 also includes generating the measured state 236 from the points 238. The measured state 236 generally includes a first measured segment 240 and a second measured segment 242. The first measured segment 240 includes a first measured center 244 and the second measured segment 242 includes a second measured center 246. The first measured segment 240 and the second measured segment 242 may have observable attributes, e.g., extents, velocities, yaw angles, yaw rates, or the like. In examples, the operation 232 can include applying an expectation maximization algorithm to the points 238, e.g., iteratively, to fit a model to the points 238. Examples of fitting models to articulated objects are detailed in U.S. patent application Ser. No. 16/586,455, entitled "Modeling Articulated Objects," filed Sep. 27, 2019.

At an operation 248, the process 200 also includes determining an error between the predicted state and the measured state and/or based on pseudo-observables. For instance, the error can be determined based on a comparison of the predicted state and the measured state. An example 250 accompanying the operation 248 shows the predicted state 222 and the measured state 236 together. In examples, the error can be determined as one or more of a Euclidian distance between the first predicted center 228 and the first measured center 244, a Euclidian distance between the second predicted center 230 and the second measured center 246, an angular difference between predicted and measured yaw angles of one or both of the first and second segments, velocity differences, an intersection over union of the segments, or the like. In at least some examples, the error also or alternatively may be determined using the pseudo-observables embodied by one or more of Equations (1)-(4), discussed above. For instance, while each of Equations (1)-(4) has an expected zero sum, applying those equations to one or both of the measured state 236 and/or the predicted state 222 may result in a sum other than zero. This non-zero sum may be the error. In other examples, the error may be determined using other techniques. By way of non-limiting example, the error can be determined based on overlapping areas of the predicted state 222 and the measured state 236. For instance, techniques including intersection over union, size and/or feature comparison, or the like, can be used to determine (and quantify) the error.

At an operation 252, the process 200 determines an updated state of the articulated object based at least in part on the error. In an example 254 accompanying the operation 252, one or more filtering algorithms 256 use the error, e.g., based at least in part on the measured state 236, and the predicted state 222 to determine an updated state 258. In examples, the filtering algorithm(s) 256 may include one or more extended Kalman filters. For instance, the filtering algorithm(s) 256 can include a first extended Kalman filter to determine a first updated segment 260 of the updated state 258, e.g., based on the first predicted segment 224 and/or the first measured segment 240, and a second extended Kalman filter to determine a second updated segment 262 of the updated state 258, e.g., based on the second predicted segment 226 and/or the second measured segment 242. As illustrated, the first updated segment 260 includes a first updated center 264 and the second updated segment 262 includes a second updated center 266.

In examples, aspects of the extended Kalman filters can be varied based at least in part on the error determined at the operation 248. By way of non-limiting example, a gain associated with the extended Kalman filter(s) can be based at least in part on the error. In at least some examples, the Kalman filter gain can be multiplied by the error determined at the operation 248, with the product being added to the predicted state 222 to arrive at the updated state 258. Covariance matrices also may be varied based at least in part on the error and/or based on other factors. For instance, covariances may be based at least in part on a track of the articulated object, a confidence associated with sensors and/or sensor data, or the like. In at least some examples, such covariances may additionally or alternatively provided to any one or more additional components (e.g., a planner component) such that those additional or alternative components may operate based on the provided covariances. As a non-limiting example, a planner component may determine a trajectory with a larger area around the articulated object based on a high covariance. Although extended Kalman filters are provided as examples, the filtering algorithm(s) 256 can include one or more additional or alternative filtering techniques, including but not limited to Kalman filters.

Figure 3:
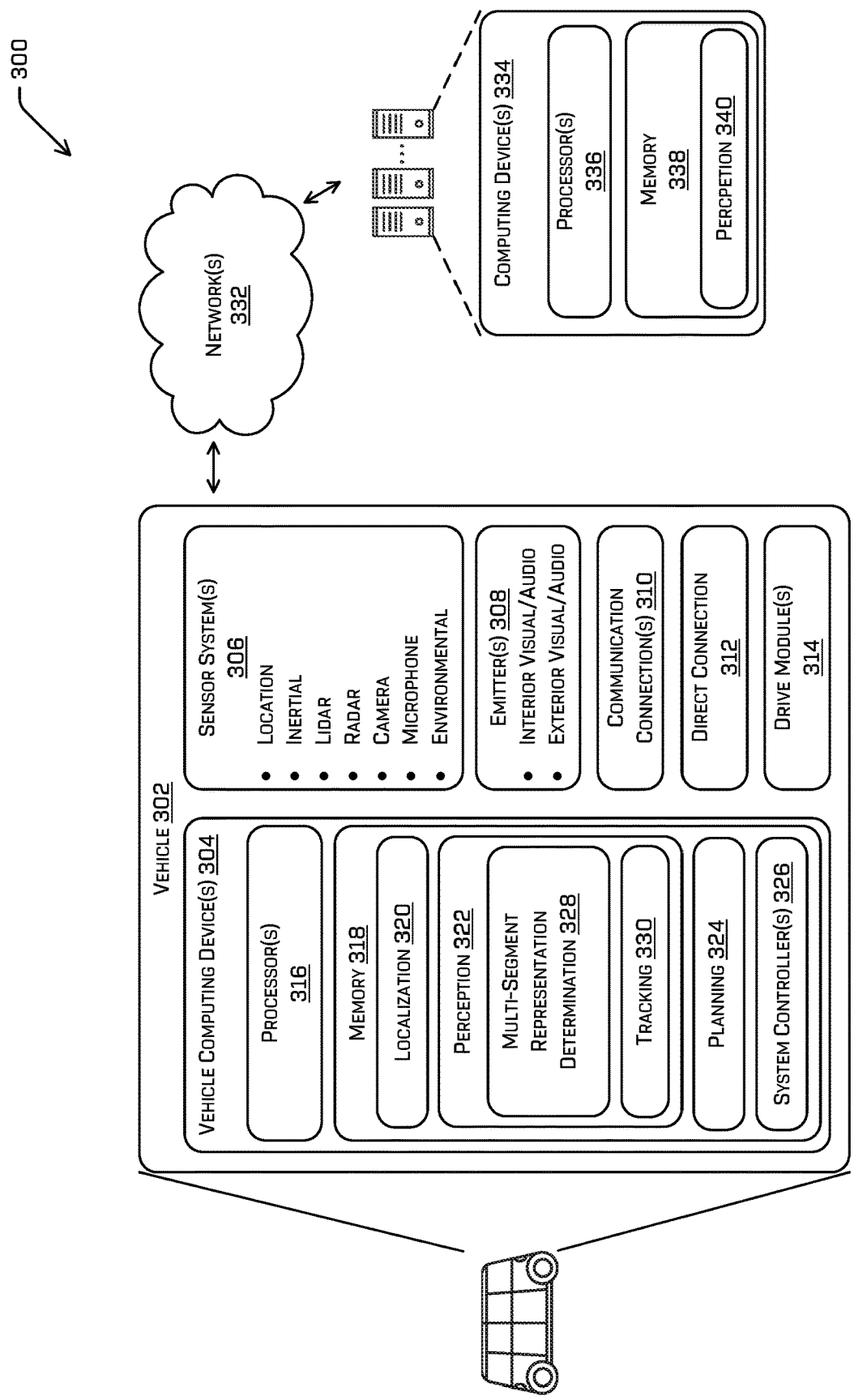
FIG. 3 depicts a block diagram of example vehicle and remote computing systems for tracking an articulated object, according to aspects of this disclosure.

FIG. 3 illustrates a block diagram of an example system 300 for implementing the techniques described herein. In at least one example, the system 300 can include a vehicle 302, which can be the same vehicle as the vehicle 102 described above with reference to FIG. 1.

The vehicle 302 can include a vehicle computing device 304, one or more sensor systems 306, one or more emitters 308, one or more communication connections 310, at least one direct connection 312, and one or more drive modules 314.

The vehicle computing device 304 can include one or more processors 316 and memory 318 communicatively coupled to the one or more processors 316. In the illustrated example, the vehicle 302 is an autonomous vehicle; however, the vehicle 302 can be any other type of vehicle. Moreover, the techniques described herein are not limited to vehicles, and can be used in other sensing environment. In the illustrated example, the memory 318 of the vehicle computing device(s) 304 stores a localization component 320, a perception component 322, a planning component 324, and one or more system controllers 326. Moreover, the perception component 322 includes a multi-segment representation determination component 328 and a tracking component 330. Though depicted in FIG. 3 as residing in the memory 318 for illustrative purposes, it is contemplated that several of the features, including the multi-segment representation determination component 328, the tracking component 330 (or aspects thereof), and/or other components may additionally, or alternatively, be accessible to the vehicle 302 (e.g., stored remotely).

In at least one example, the localization component 320 can include functionality to receive data from the sensor system(s) 306 to determine a position of the vehicle 302. For example, the localization component 320 can include, request, and/or receive a three-dimensional map of an environment and can continuously determine a location of the vehicle 302 within the map. In some instances, the localization component 320 can utilize SLAM (simultaneous localization and mapping) or CLAMS (calibration, localization and mapping, simultaneously) to receive image data, LIDAR data, radar data, SONAR data, IMU data, GPS data, wheel encoder data, and/or the like to accurately determine a location of the vehicle 302. In some instances, the localization component 320 can provide data to various components of the vehicle 302 to determine an initial position of the vehicle 302 for generating a candidate trajectory.

In some instances, the perception component 322 can include functionality to perform object detection, segmentation (e.g., semantic segmentation), and/or classification. The perception component 322 can be substantially the same as, and/or include functionality described above in connection with, the perception system 112. In some examples, the perception component 322 can provide processed sensor data that indicates a presence of an entity that is proximate to the vehicle 302 and/or a classification of the entity as an entity type (e.g., articulated object, car, pedestrian, cyclist, animal, tree, road surface, curb, sidewalk, lamppost, signpost, unknown, etc.). In implementations, the perception component can specifically identify articulated objects, such as articulated vehicles, and generate estimated state information for each of a plurality of segments comprising a representation of the articulated object. In additional and/or alternative examples, the perception component 322 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), one or more yaw angles associated with the entity, one or more yaw rates associated with the entity, etc. Characteristics associated with the environment can include, but are not limited to, a presence of another entity in the environment, a state of another entity in the environment, a time of day, a day of a week, a season, a weather condition, an indication of darkness/light, etc.

The perception component 322 includes the multi-segment representation determination component 328 and the tracking component 330.

In general, the multi-segment representation determination component 328 can generate representations of objects, such as articulated objects. In examples, the multi-segment representation determination component 328 can be substantially the same as, and/or include functionality described above in connection with, the multi-segment representation determination component 116. For instance, the multi-segment representation determination component 328 can receive data, e.g., sensor data, associated with an articulated object and fit a model to the data. The model may then be manipulated, e.g., iteratively updated, to fit the data. For example, the model can include multiple geometric structures fixed to each other via a pivot. In at least some examples, the multi-segment representation determination component 328 can use an expectation-maximization algorithm to fit the model to the data. By fitting a multi-segment model to the data, the multi-segment representation determination component 328 can generate a plurality of connected bounding boxes that more accurately represent articulated objects in the environment.

The tracking component 330 can generate and store estimated states of tracked objects, such as articulated objects. In examples, the tracking component 330 can be substantially the same as, and/or include functionality described above in connection with, the tracking component 118. For instance, the tracking component 330 can perform the process 200 to determine a track, such as the track 136, of an articulated object. The tracking component 330 can generate a projected state of an articulated object based on a previous state of that object. The tracking component 330 can also compare the projected state to a measured state. The measured state may be a measured model generated by the multi-segment representation determination component 328. The tracking component 330 can determine errors based on the comparison of the projected state and the measured state. In some examples, the error can be a displacement or distance between segments of the respective models. In other examples, the tracking component 330 can determine the errors using pseudo-observables. The pseudo-observables may be associated with constraints that are expected of the multi-segment states, e.g., based on attributes of the articulated object. Such attributes can include the connectedness of the multiple segments, e.g., at a pivot, the driving/following relationship of the multiple segments, or the like. In at least some examples, the tracking component can implement filtering algorithms, such as an extended Kalman filter, to determine updated states of the articulated object.

The planning component 324 can be substantially the same as, and/or include functionality described above in connection with, the planning system 114. In general, the planning component 324 can determine a path for the vehicle 302 to follow to traverse through an environment. For example, the planning component 324 can determine various routes and trajectories and various levels of detail. The planning component 324 may determine a route to travel from a first location (e.g., a current location) to a second location (e.g., a target location). For the purpose of this discussion, a route can be a sequence of waypoints for travelling between the two locations. As non-limiting examples, waypoints can include streets, intersections, global positioning system (GPS) coordinates, etc. Further, the planning component 324 can generate an instruction for guiding the autonomous vehicle along at least a portion of the route from the first location to the second location. In at least one example, the planning component 324 can determine how to guide the autonomous vehicle from a first waypoint in the sequence of waypoints to a second waypoint in the sequence of waypoints. In some examples, the instruction can be a trajectory, or a portion of a trajectory. Also in some examples, multiple trajectories can be substantially simultaneously generated (e.g., within technical tolerances) in accordance with a receding horizon technique.

The system controller(s) 326 can be configured to control steering, propulsion, braking, safety, emitter, communication, and other systems of the vehicle 302. The system controller(s) 326 can communicate with and/or control corresponding systems of the drive module(s) 314 and/or other components of the vehicle 302.

In some instances, aspects of some or all of the components discussed herein may include any models, algorithms, and/or machine learning algorithms. For example, in some instances, the components in the memory 318 (and memory 338, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet30, ResNet101, VGG, DenseNet, PointNet, and the like.

The sensor system(s) 306 can include one or more of LiDAR sensors, radar sensors, time-of-flight sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors (and/or radar sensors) can include individual LIDAR sensors (or radar sensors) located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally, or alternatively, the sensor system(s) 306 can send sensor data, via one or more networks 332, to one or more remote computing devices at a particular frequency, after a lapse of a predetermined period of time, in near real-time, etc.

The emitter(s) 308 can include structure and functionality for emitting light and/or sound. The emitter(s) 308 can include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 can also include exterior emitters. By way of example and not limitation, the exterior emitters in this example can include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 310 can enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communication connection(s) 310 can include physical and/or logical interfaces for connecting the vehicle computing device 304 to another computing device or a network, such as the network(s) 332. For example, the communications connection(s) 310 can enable Wi-Fi-based communication such as via frequencies defined by the IEEE 802.11 standards, short range wireless frequencies such as Bluetooth, cellular communication (e.g., 2G, 3G, 3G, 3G LTE, 5G, etc.) or any suitable wired or wireless communications protocol that enables the respective computing device to interface with the other computing device(s).

The drive module(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

In some examples, the drive module(s) 314 may be a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) 306 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 314. In some cases, the sensor system(s) on the drive module(s) 314 can overlap or supplement corresponding systems of the vehicle 302 (e.g., the sensor system(s) 306).

The processor(s) 316 of the vehicle 302 can be any suitable processor capable of executing instructions to process data and perform operations as described herein. By way of example and not limitation, the processor(s) 316 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318 is an example of non-transitory computer-readable media. The memory 318 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 3 is illustrated as a distributed system, in alternative examples, components of the vehicle 302 can be associated with remote computing devices accessible via the network(s) 332. For example, the vehicle 302 can send sensor data to one or more computing devices 334, via the network(s) 332. In some examples, the vehicle 302 can send raw sensor data to the computing device(s) 334. In other examples, the vehicle 302 can send processed sensor data and/or representations of sensor data to the computing device(s) 334. In some examples, the vehicle 302 can send sensor data to the computing device(s) 334 at a particular frequency, after a lapse of a predetermined period of time, in near real-time, etc. In some cases, the vehicle 302 can send sensor data (raw or processed) to the computing device(s) 334 as one or more log files.

The computing device(s) 334 can receive the sensor data (raw or processed), and/or representations generated based on the sensor data, and can perform operations on the data. In at least one example, the computing device(s) 334 can include one or more processors 336 and memory 338 communicatively coupled to the processor(s) 336. In the illustrated example, the memory 338 of the computing device(s) 334 stores a perception component 340. The perception component 340 can include functionality to perform operations similar to some or all of those discussed above in the context of the perception component 322. In some instances, the processor(s) 336 and the memory 338 can include functionality and/or structure similar to that discussed above with respect to the processor(s) 316 and the memory 318.

Figure 4:
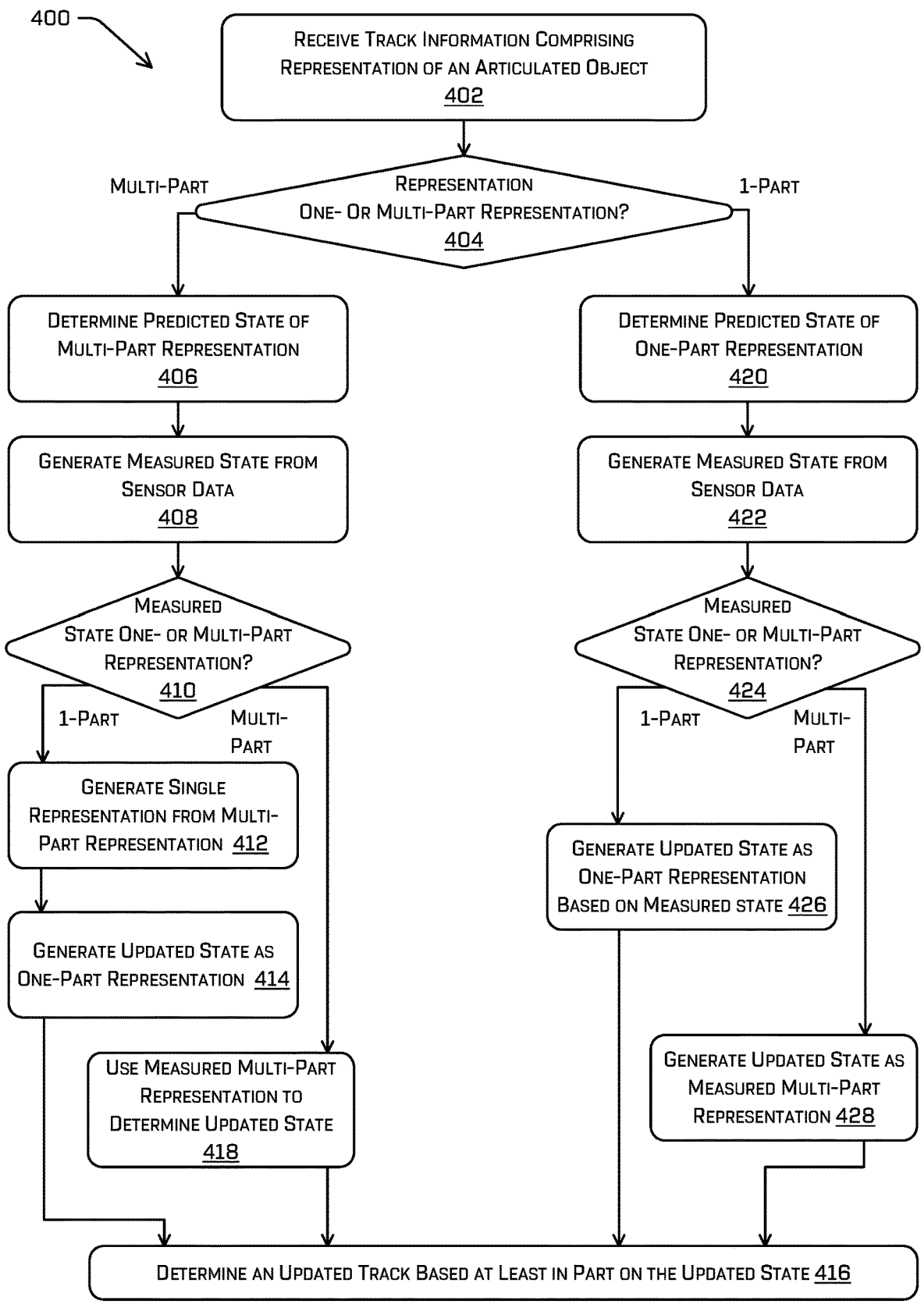
FIG. 4 is a flowchart illustrating an example method for tracking articulated objects, according to aspects of this disclosure.
Figure 5:
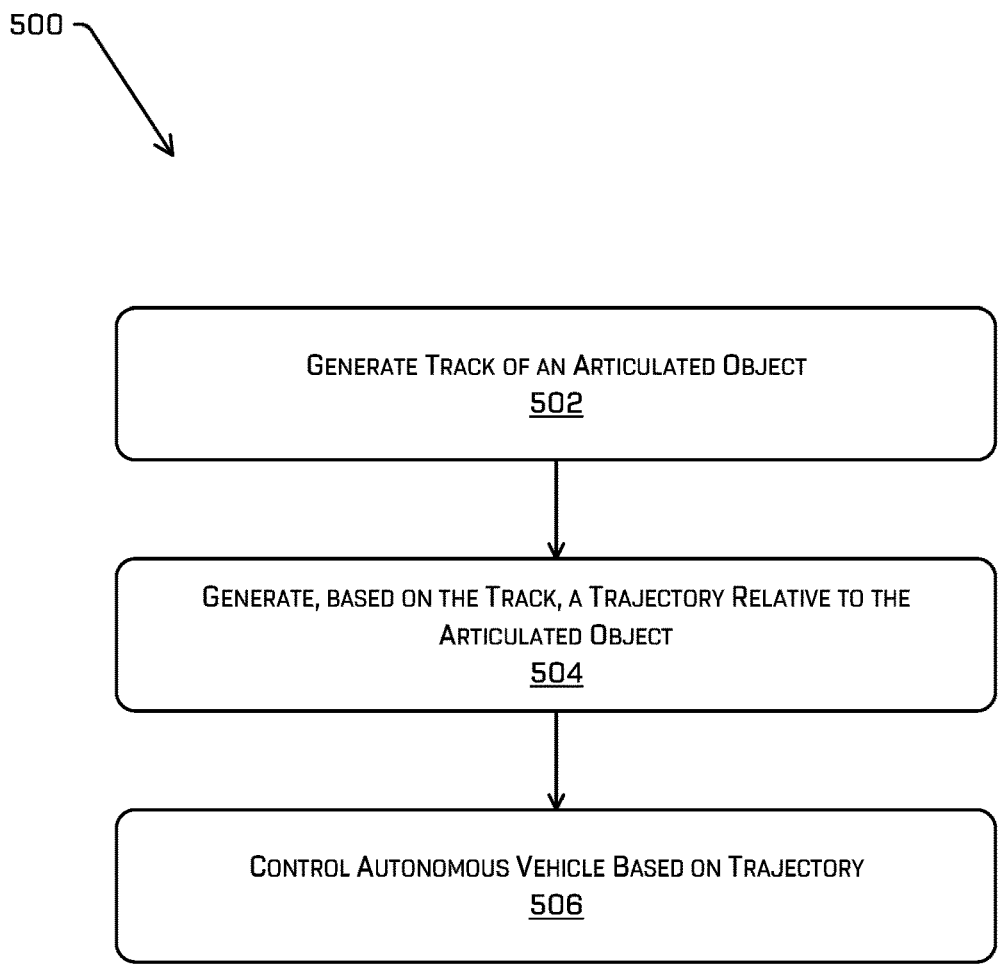
FIG. 5 is a flowchart illustrating an example method for controlling a vehicle relative to objects, such as articulated objects tracked according to techniques described herein.

FIGS. 4 and 5 (and FIG. 2, discussed above) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 depicts an example process 400 for tracking an object, such as an articulated object. For example, some or all of the process 400 can be performed by vehicle computing device(s) 110 and/or by one or more components illustrated in FIG. 3, as described herein. For example, some or all of the process 400 can be performed by the perception component 322 and/or portions of the perception component 322, such as illustrated in FIG. 3. However, the process 400 is not limited to being performed by these components, and the components are not limited to performing the process 400.

At operation 402, the process 400 includes receiving track information comprising a representation of an articulated object. For example, techniques described herein may be useful to model articulated objects, and the operation 402 may include a previous estimate of a state of an articulated object. For instance, the tracking information can include previous pose information for the articulated object, which may include physical attributes and/or movement information associated with a representation of the articulated. Without limitation, the pose information can include position information, extent information, velocity information, yaw angle or other orientation information, yaw rate information, or other data. In some examples, the track information can be two-dimensional information, as in the top-down representation 128, while in other examples the track information can be three-dimensional information.

At operation 404, the process 400 can include determining whether the representation is a one- or multi-part representation. For example, techniques described herein can track both single- and multi-segment representations. A single-part representation can include a single shape, e.g., a bounding box, representing an entirety of an object. In the case of articulated objects, a single-part representation can be overinclusive, especially when the portions of the articulated object are articulated relative to each other. In contrast, multi-part representation can include multiple segments, each corresponding to a different portion of the articulated agent. A multi-part representation may be characterized as having two or more single shape representations connected at, and movable relative to each other about, a point, such as a pivot point.

If at the operation 404 it is determined that the representation received at the operation 402 is a multi-part representation, the process 400 includes, at an operation 406, determining a predicted state of the multi-part representation. For example, each segment of the representation may be projected forward in time by some predetermined amount, e.g., by some predetermined time. The predicted state can include first predicted pose information about a first predicted segment and second predicted pose information about a second predicted segment. For instance, the operation 404 can include techniques described above in connection with the operation 218 of FIG. 2.

At operation 408, the process 400 includes generating a measured state from sensor data. For example, a sensor, such as a sensor disposed on an autonomous vehicle navigating relative to the articulated object can generate sensor data, such as LiDAR data, camera data, and/or other data. Based on this sensor data, a measured representation can be determined. For instance, the multi-segment representation determination component 328 can receive the sensor data and attempt to fit a multiple-segment representation thereto. In other instances, the perception component 322 and/or other aspects can determine a single-segment representation of the data. For example, the single-segment representation may result from improper functioning of the multi-segment representation determination component 328, from a failure to recognize the sensor data as being associated with an articulated agent, from the articulated object being axially aligned, or otherwise.

At operation 410, the process 400 includes determining whether the measured state is a one- or multi-part representation.

If, at the operation 410, it is determined that the measured state is a one-part representation, the process 400 includes, at an operation 412, generating a single-representation from the multi-part representation. For example, when the measured data indicates that the detected object is represented by a single representation, e.g., because the object is not an articulated object, the object is no longer articulated, the multi-segment representation determination component has failed, or the like, the process may substitute the multi-part representation received at 402 with a single-part representation. For instance, the single part representation can be determined, e.g., by the perception system, as a single representation having a size that encompasses the multiple segments. Other state information for the single representation may also be determined based on the multi-segment representation. In other aspects, the perception system may generate single-part representations for all objects, in addition to the multi-part representations of the articulated objects. Thus, for instance, the operation 412 may include accessing the already-generated single-part representation. As described herein, the single-part representation may not be as precise as a multi-part representation, but the single-part representation may still be generated.

At an operation 414, the process 400 includes generating an updated state as a one-part representation. For example, when the measured state corresponds to a single-part representation, the updated state, e.g., the next estimated state in a track, will also be a single-part representation. In some examples, the updated state may be determined using one or more filtering algorithms.

Then, at an operation 416, the process 400 includes determining an updated track based at least in part on the updated state. For example, a new track may be generated that includes the single-part representation generated at the operation 412 and the updated state determined at the operation 414. In alternative examples, a new track may be generated including only the updated state determined at the operation 414.

If, at the operation 410, it is determined that the measured state is a multi-part representation, the process 400 includes, at an operation 418, using the measured multi-part representation to determine an updated state. For example, the operation 418 can generally include the operation 248 and the operation 252 detailed above to generate an updated state for a multi-part model. In examples, generating the updated state can include determining an error between the projected state determined at the operation 406 and the measured state generated at the operation 408. A filtering algorithm can use the error to generate the updated state. In examples, the error can be determined based on observable attributes of the projected state and the measured state and/or based on pseudo-observable attributes.

From the operation 418, the process 400 proceeds to the operation 416, where an updated track is determined based at least in part on the updated state. In this example, the updated state includes a multi-part representation that can be added to the track information received at the operation 402.

If at the operation 404, it is determined that the representation received at the operation 402 is a one-part representation, at operation 420 the process 400 includes determining a predicted state of the one-part representation. For example, the single segment of the representation may be projected forward in time by some predetermined amount, e.g., by some predetermined time. The predicted state can include predicted pose information for the single segment.

At operation 422, the process 400 includes generating a measured state from sensor data. For example, a sensor, such as a sensor disposed on an autonomous vehicle navigating relative to the articulated object can generate sensor data, such as LiDAR data, camera data, and/or other data. Based on this sensor data, a measured representation can be determined. The operation 422 can be substantially identical to the operation 408.

At operation 424, the process 400 includes determining whether the measured state is a one- or multi-part representation. For example, the operation 422 can result in either of a single-part representation or a multi-part representation.

If, at the operation 424, it is determined that the measured state is a one-part representation, the process 400 includes, at an operation 426, generating an updated state as a one-part representation based on the measured state. In examples, generating the updated state can include determining an error between the projected state determined at the operation 420 and the measured state generated at the operation 422. A filtering algorithm can use the error to generate the updated state.

From the operation 426, the process 400 proceeds to the operation 416, at which an updated track for the single-part representation is generated. In this example, the updated state includes a single-part representation that can be added to the track information received at the operation 402.

If, at the operation 424, it is determined that the measured state is a multi-part representation, at an operation 428, the process 400 can include generating an updated state as the measured multi-part representation. For example, the operation 424 may determine that the measured two-part model indicates a new indication of an articulated object, e.g., for which prior information is not known or reliable.

From the operation 428, the process 400 proceeds to the operation 416. In this example, the updated track may be a new track, e.g., with the measured state making up a first iteration of the new track. Subsequent iterations of the track may then be determined using the process 400.

As will be appreciated, the process 400 is an iterative process that may be used to continuously track objects, such as articulated objects in an environment. For example, once an updated track is determined at the operation 416, the updated track may be received as the track information at the operation 402 for continued tracking. The process 400 may provide a single solution to track both articulated objects and non-articulated objects, and to account for errors in modeling such objects. In some examples, the updated states may be generated using algorithms, such as filtering algorithms. In at least some implementations, the filtering algorithms can include a filter for each segment of a multiple-segment representation. When representations include only a single segment, e.g., as in a non-articulated object, only the first filter may be used. However, second and additional filters may be available and only used for processing multiple-segment representations.

FIG. 5 depicts an example process 500 for controlling an autonomous vehicle relative to objects in an environment, as discussed herein. For example, some or all of the process 500 can be performed by the vehicle 102 of FIG. 1 and/or the vehicle 302 and its related components illustrated in and discussed with reference to, FIG. 3. For example, some or all of the process 500 can be performed by the localization component 320, the perception component 322, the planning component 324, and/or the system controller(s) 326.

At operation 502, the process can include generating a track of an articulated object. For example, the track may be generated according to the techniques illustrated in, and described in connection with, FIGS. 2 and 4. The track may include serial estimations of representations include multiple connected segments.

At operation 504, the process 500 can include generating, based on the track, a trajectory relative to the articulate object. For example, the planning component 326 of the vehicle computing device(s) 304 can further determine relative movement, e.g., velocity and acceleration, of the objects in the environment using the track information and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like.

At operation 506, the process 500 can include controlling an autonomous vehicle based on the trajectory. In some instances, the operation 506 can include generating commands that can be relayed to a controller onboard an autonomous vehicle to control the autonomous vehicle to drive a travel path according to the trajectory. Although discussed in the context of an autonomous vehicle, the process 500, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example method includes: receiving previous state information associated with an articulated object in an environment comprising first previous pose information for a first previous representation of a first portion of the articulated object and second previous pose information for a second previous representation of a second portion of the articulated object, the first portion and the second portion having an associated pivot point about which the first portion and the second portion rotate; determining, using a first model and based on the previous state, a first predicted state of the first segment of the articulated object; determining, using a second model and based on the previous state, a second predicted state of the second segment of the articulated object; determining, based at least in part on the first predicted state and the second predicted state, a predicted state of the articulated object; receiving sensor data; generating, based at least in part on the sensor data, a measured state of the articulated object, the measured state comprising first measured pose data of a first measured representation of the first portion of the articulated object and second measured pose data of a second measured representation of the second portion of the articulated object; determining an error between the predicted state of the articulated object and the measured state of the articulated object; determining, based at least in part on the error and the measured state, an updated state of the articulated object; and controlling, based at least in part on the updated state of the articulated object, an autonomous vehicle to navigate the environment relative to the articulated object.

B: The method of example A, wherein at least one of: the first previous pose information comprises at least one of a first center of the first previous representation, one or more first dimensions associated with the first previous representation, a first yaw angle of the first previous representation, or a first yaw rate of the first previous representation; and the second previous pose information comprises at least one of a second center of the second previous representation, one or more second dimensions associated with the second previous representation, or a second yaw angle of the second previous representation, a second yaw rate of the second previous representation.

C: The method of example A or example B, wherein the first model and the second model comprise one or more first pseudo-observables based at least in part on a first constraint associated with the pivot point.

D: The method of any one of example A through example C, wherein the first model comprises a second pseudo-observable based at least in part on a first non-holonomic constraint and the second model comprises a third pseudo-observation based at least in part on a second non-holonomic constraint.

E: The method of any one of example A through example D, wherein the first model is a first extended Kalman filter; and the second model is a second extended Kalman filter.

F: An example system includes: one or more processors; and memory storing processor-executable instructions that, when executed by the one or more processors, cause the system to perform operations comprising: receiving previous state information associated with an articulated object in an environment comprising first previous pose information for a first previous representation of a first portion of the articulated object and second previous pose information for a second previous representation of a second portion of the articulated object, the first portion and the second portion having an associated pivot point about which the first portion and the second portion rotate; determining, based on the previous state information and a first model, a first predicted state of the first portion of the articulated object; determining, based on the previous state information a second model, a second predicted state of the second portion of the articulated object; determining, based on the first predicted state and the second predicted state, a predicted state of the articulated object; receiving sensor data of an environment; determining, based at least in part on the sensor data, a measured state of the articulated object; and determining, based at least in part on the predicted state and the measured state, an updated state of the articulated object, the updated state comprising at least one of an updated position, a yaw, or a yaw rate associated with the articulated object.

G: The system of example F, wherein the determining the updated state of the articulated object comprises: determining, using the first model and based on the first predicted state, a first updated representation of the first portion of the articulated object; and determining, using the second model and based on the second predicted state, a second updated representation of the second portion of the articulated object.

H: The system of example G or example H, wherein: the first previous pose information comprises at least one of a first center of the first previous representation, one or more first dimensions associated with the first previous representation, a first yaw angle of the first previous representation, or a first yaw rate of the first previous representation; and the second previous pose information comprises at least one of a second center of the second previous representation, one or more second dimensions associated with the second previous representation, or a second yaw angle of the second previous representation, a second yaw rate of the second previous representation.

I: The system of any one of example G through example H, wherein the first model and the second model comprise one or more pseudo-observables based at least in part on a constraint associated with the pivot point.

J: The system of any one of example G through example I, wherein the constraint is based at least in part on a relationship of a first distance and a second distance, the first distance being a distance between a first center associated with the first segment of the articulated object and the pivot point and the second distance being a distance between a second center associated with the second segment of the articulated object and the pivot point.

K: The system of any one of example G through example J, wherein the first model comprises a first pseudo-observable based at least in part on a first non-holonomic constraint and the second model comprises a second pseudo-observable based at least in part on a second non-holonomic constraint.

L: The system of any one of example G through example K, wherein the first non-holonomic constraint is based at least in part on a velocity of the first segment, a yaw of the first segment, and extents of the first segment.

M: The system of any one of example G through example L, wherein the second non-holonomic constraint is based at least in part on a velocity of the first segment, a yaw of the first segment, a yaw of the second segment, a yaw rate of the first segment, extents of the first segment, and extents of the second segment.

N: The system of any one of example G through example M, wherein: the first model is a first extended Kalman filter; and the second model is a second extended Kalman filter.

O: The system of any one of example G through example N, the operations further comprising: determining an error between the predicted state and the measured state, the error comprising at least one of a Euclidian distance between centers, an angular difference between yaw angles, or an intersection over union.

P: One or more example non-transitory computer readable media storing instructions that, when executed by one or more processors, cause a computing device to perform operations comprising: receiving previous state information associated with an articulated object in an environment comprising first previous pose information for a first previous representation of a first portion of the articulated object and second previous pose information for a second previous representation of a second portion of the articulated object, the first portion and the second portion having an associated pivot point about which the first portion and the second portion rotate; determining, based on the previous state information and a first model, a first predicted state of the first portion of the articulated object; determining, based on the previous state information a second model, a second predicted state of the second portion of the articulated object; determining, based on the first predicted state and the second predicted state, a predicted state of the articulated object; receiving sensor data of an environment; determining, based at least in part on the sensor data, a measured state of the articulated object; and determining, based at least in part on the predicted state and the measured state, an updated state of the articulated object, the updated state comprising at least one of an updated position, a yaw, or a yaw rate associated with the articulated object.

Q: The one or more non-transitory computer readable media of example P, wherein the first model and the second model comprise one or more pseudo-observables based at least in part on a constraint associated with the pivot point.

R: The one or more non-transitory computer readable media of example P or example Q, wherein the constraint is based at least in part on a relationship of a first distance and a second distance, the first distance being a distance between a first center associated with the first segment of the articulated object and the pivot point and the second distance being a distance between a second center associated with the second segment of the articulated object and the pivot point.

S: The one or more non-transitory computer readable media of any one of example P through example R, wherein the first model comprises a first pseudo-observable based at least in part on a first non-holonomic constraint and the second model comprises a second pseudo-observable based at least in part on a second non-holonomic constraint.

T: The one or more non-transitory computer readable media of any one of example P through example S, wherein at least one of the first non-holonomic constraint or the second non-holonomic constraint is based at least in part on one or more of a velocity of the first segment, a yaw of the first segment, a yaw of the second segment, a yaw rate of the first segment, extents of the first segment, and extents of the second segment.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A method comprising:
receiving previous state information associated with an articulated object in an environment comprising first previous pose information for a first previous representation of a first portion of the articulated object and second previous pose information for a second previous representation of a second portion of the articulated object, the first portion and the second portion having an associated pivot point about which the first portion and the second portion rotate;
determining, using a first model and based on the previous state, a first predicted state of the first segment of the articulated object;
determining, using a second model and based on the previous state, a second predicted state of the second segment of the articulated object;
determining, based at least in part on the first predicted state and the second predicted state, a predicted state of the articulated object;
receiving sensor data;
generating, based at least in part on the sensor data, a measured state of the articulated object, the measured state comprising first measured pose data of a first measured representation of the first portion of the articulated object and second measured pose data of a second measured representation of the second portion of the articulated object;
determining an error between the predicted state of the articulated object and the measured state of the articulated object;
determining, based at least in part on the error and the measured state, an updated state of the articulated object; and
controlling, based at least in part on the updated state of the articulated object, an autonomous vehicle to navigate the environment relative to the articulated object.

2. The method of claim 1, wherein at least one of:
the first previous pose information comprises at least one of a first center of the first previous representation, one or more first dimensions associated with the first previous representation, a first yaw angle of the first previous representation, or a first yaw rate of the first previous representation; and
the second previous pose information comprises at least one of a second center of the second previous representation, one or more second dimensions associated with the second previous representation, or a second yaw angle of the second previous representation, a second yaw rate of the second previous representation.

3. The method of claim 1, wherein the first model and the second model comprise one or more first pseudo-observables based at least in part on a first constraint associated with the pivot point.

4. The method of claim 3, wherein the first model comprises a second pseudo-observable based at least in part on a first non-holonomic constraint and the second model comprises a third pseudo-observation based at least in part on a second non-holonomic constraint.

5. The method of claim 1, wherein the first model is a first extended Kalman filter; and
the second model is a second extended Kalman filter.

6. A system comprising:
one or more processors; and
memory storing processor-executable instructions that, when executed by the one or more processors, cause the system to perform operations comprising:
receiving previous state information associated with an articulated object in an environment comprising first previous pose information for a first previous representation of a first portion of the articulated object and second previous pose information for a second previous representation of a second portion of the articulated object, the first portion and the second portion having an associated pivot point about which the first portion and the second portion rotate;
determining, based on the previous state information and a first model, a first predicted state of the first portion of the articulated object;
determining, based on the previous state information a second model, a second predicted state of the second portion of the articulated object;
determining, based on the first predicted state and the second predicted state, a predicted state of the articulated object;
receiving sensor data of an environment;
determining, based at least in part on the sensor data, a measured state of the articulated object; and
determining, based at least in part on the predicted state and the measured state, an updated state of the articulated object, the updated state comprising at least one of an updated position, a yaw, or a yaw rate associated with the articulated object.

7. The system of claim 6, wherein the determining the updated state of the articulated object comprises:
determining, using the first model and based on the first predicted state, a first updated representation of the first portion of the articulated object; and
determining, using the second model and based on the second predicted state, a second updated representation of the second portion of the articulated object.

8. The system of claim 6, wherein:
the first previous pose information comprises at least one of a first center of the first previous representation, one or more first dimensions associated with the first previous representation, a first yaw angle of the first previous representation, or a first yaw rate of the first previous representation; and
the second previous pose information comprises at least one of a second center of the second previous representation, one or more second dimensions associated with the second previous representation, or a second yaw angle of the second previous representation, a second yaw rate of the second previous representation.

9. The system of claim 6, wherein the first model and the second model comprise one or more pseudo-observables based at least in part on a constraint associated with the pivot point.

10. The system of claim 9, wherein the constraint is based at least in part on a relationship of a first distance and a second distance, the first distance being a distance between a first center associated with the first segment of the articulated object and the pivot point and the second distance being a distance between a second center associated with the second segment of the articulated object and the pivot point.

11. The system of claim 6, wherein the first model comprises a first pseudo-observable based at least in part on a first non-holonomic constraint and the second model comprises a second pseudo-observable based at least in part on a second non-holonomic constraint.

12. The system of claim 11, wherein the first non-holonomic constraint is based at least in part on a velocity of the first segment, a yaw of the first segment, and extents of the first segment.

13. The system of claim 11, wherein the second non-holonomic constraint is based at least in part on a velocity of the first segment, a yaw of the first segment, a yaw of the second segment, a yaw rate of the first segment, extents of the first segment, and extents of the second segment.

14. The system of claim 13, wherein:
the first model is a first extended Kalman filter; and
the second model is a second extended Kalman filter.

15. The system of claim 14, the operations further comprising:
determining an error between the predicted state and the measured state, the error comprising at least one of a Euclidian distance between centers, an angular difference between yaw angles, or an intersection over union.

16. One or more non-transitory computer readable media storing instructions that, when executed by one or more processors, cause a computing device to perform operations comprising:
receiving previous state information associated with an articulated object in an environment comprising first previous pose information for a first previous representation of a first portion of the articulated object and second previous pose information for a second previous representation of a second portion of the articulated object, the first portion and the second portion having an associated pivot point about which the first portion and the second portion rotate;
determining, based on the previous state information and a first model, a first predicted state of the first portion of the articulated object;
determining, based on the previous state information a second model, a second predicted state of the second portion of the articulated object;
determining, based on the first predicted state and the second predicted state, a predicted state of the articulated object;
receiving sensor data of an environment;
determining, based at least in part on the sensor data, a measured state of the articulated object; and
determining, based at least in part on the predicted state and the measured state, an updated state of the articulated object, the updated state comprising at least one of an updated position, a yaw, or a yaw rate associated with the articulated object.

17. The one or more non-transitory computer readable media of claim 16, wherein the first model and the second model comprise one or more pseudo-observables based at least in part on a constraint associated with the pivot point.

18. The one or more non-transitory computer readable media of claim 17, wherein the constraint is based at least in part on a relationship of a first distance and a second distance, the first distance being a distance between a first center associated with the first segment of the articulated object and the pivot point and the second distance being a distance between a second center associated with the second segment of the articulated object and the pivot point.

19. The one or more non-transitory computer readable media of claim 16, wherein the first model comprises a first pseudo-observable based at least in part on a first non-holonomic constraint and the second model comprises a second pseudo-observable based at least in part on a second non-holonomic constraint.

20. The one or more non-transitory computer readable media of claim 19, wherein at least one of the first non-holonomic constraint or the second non-holonomic constraint is based at least in part on one or more of a velocity of the first segment, a yaw of the first segment, a yaw of the second segment, a yaw rate of the first segment, extents of the first segment, and extents of the second segment.

\* \* \* \* \*